(12) United States Patent
Kim et al.

(10) Patent No.: US 9,073,587 B2
(45) Date of Patent: Jul. 7, 2015

(54) PASSIVE TRANSFORMABLE WHEEL AND ROBOT HAVING THE WHEEL

(71) Applicant: SNU R&DB FOUNDATION, Gwanak-gu (KR)

(72) Inventors: Yoo Seok Kim, Gwanak-gu (KR); Haan Kim, Gwanak-gu (KR); Chong Nam Chu, Gwanak-gu (KR); Gwang Pil Jung, Gwanak-gu (KR); Kyu Jin Cho, Gwanak-gu (KR)

(73) Assignee: SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 14/173,641

(22) Filed: Feb. 5, 2014

(65) Prior Publication Data
US 2014/0158439 A1    Jun. 12, 2014

(30) Foreign Application Priority Data

Dec. 7, 2012 (KR) ........................ 10-2012-0141875

(51) Int. Cl.
*B62D 57/028* (2006.01)
*B60B 19/02* (2006.01)
*B60B 25/02* (2006.01)

(52) U.S. Cl.
CPC ............. *B62D 57/028* (2013.01); *Y10S 901/01* (2013.01); *B60B 19/02* (2013.01); *B60B 25/02* (2013.01); *B60B 2900/351* (2013.01)

(58) Field of Classification Search
CPC ..... B62D 57/00; B62D 57/028; B62D 57/024
USPC ........................ 180/218, 8.2, 8.3, 7.1; 280/5.2
See application file for complete search history.

(56) References Cited

U.S. PATENT DOCUMENTS

| | | | | |
|---|---|---|---|---|
| 1,408,885 A | * | 3/1922 | Humphrey | 301/46 |
| 1,890,872 A | * | 12/1932 | Van Kleeck | 301/51 |
| 2,032,293 A | * | 2/1936 | Maxwell | 301/46 |
| 2,044,812 A | * | 6/1936 | Roessel | 301/47 |
| 3,995,909 A | * | 12/1976 | van der Lely | 301/47 |
| 4,601,519 A | * | 7/1986 | D'Andrade | 301/45 |
| 4,643,696 A | * | 2/1987 | Law | 446/465 |
| 4,648,853 A | * | 3/1987 | Siegfried | 446/448 |
| 4,906,051 A | * | 3/1990 | Vilhauer, Jr. | 301/38.1 |
| 6,502,657 B2 | * | 1/2003 | Kerrebrock et al. | 180/218 |
| 6,548,982 B1 | * | 4/2003 | Papanikolopoulos et al. | 318/568.11 |

(Continued)

FOREIGN PATENT DOCUMENTS

KR    10-2010-0020664    2/2010
KR    10-2012-0053236    5/2012

*Primary Examiner* — Joseph Rocca
*Assistant Examiner* — Michael Stabley
(74) *Attorney, Agent, or Firm* — Ladas & Parry, LLP

(57) ABSTRACT

A passively transformable wheel includes a wheel base including a centrally positioned transmitter rotation shaft and one or more passive leg rotation shafts positioned in the outer periphery; a force transmitter rotatably coupled to an end of the transmitter rotation shaft, the force transmitter including a trigger slide and one or more passive leg joints spaced apart from one another; a trigger leg arranged between the wheel base and the force transmitter and rotatably coupled to the trigger leg rotation shaft, the trigger leg including a trigger joint fitted to the trigger slide; and
   one or more passive legs arranged between the wheel base and the force transmitter so as not to interfere with the trigger leg and rotatably coupled to the passive leg rotation shafts, the passive legs including one or more passive leg slides engaging with the passive leg joints of the force transmitter.

19 Claims, 13 Drawing Sheets

(56) References Cited

U.S. PATENT DOCUMENTS

| | | |
|---|---|---|
| 6,860,346 B2 * | 3/2005 | Burt et al. .................. 180/8.2 |
| 7,017,687 B1 * | 3/2006 | Jacobsen et al. ............ 180/8.3 |
| 7,066,425 B2 * | 6/2006 | Cornier et al. .............. 242/614 |
| 7,543,663 B2 * | 6/2009 | Setrakian et al. ............ 180/8.1 |
| 7,559,385 B1 * | 7/2009 | Burt et al. .................. 180/65.1 |
| 7,673,710 B2 * | 3/2010 | Lee et al. .................... 180/8.2 |
| 7,836,983 B2 * | 11/2010 | Setrakian et al. ............ 180/8.3 |
| 8,007,341 B2 * | 8/2011 | Su ............................... 446/448 |
| 8,104,553 B2 * | 1/2012 | Setrakian et al. ............ 180/8.1 |
| 8,162,351 B2 * | 4/2012 | Lee et al. .................... 280/755 |
| 8,186,469 B2 * | 5/2012 | Yim et al. ................... 180/218 |
| 8,307,923 B2 * | 11/2012 | Lin et al. .................... 180/8.3 |
| 8,397,842 B2 * | 3/2013 | Gettings ..................... 180/9.1 |
| 2005/0133280 A1 * | 6/2005 | Horchler et al. ............ 180/8.1 |
| 2011/0100733 A1 * | 5/2011 | Lin et al. .................... 180/8.3 |

* cited by examiner

FIG.10A
STEP1
FIG.10B
STEP2
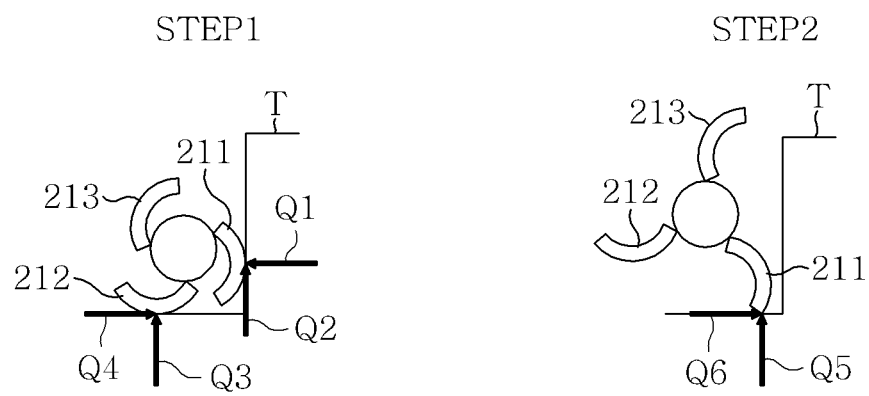
FIG.10C
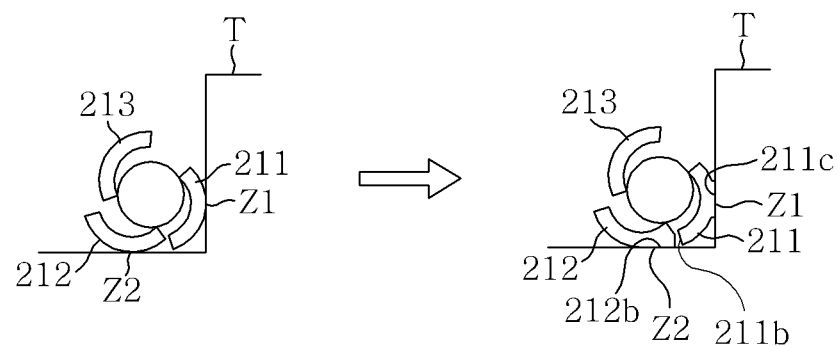

PASSIVE TRANSFORMABLE WHEEL AND ROBOT HAVING THE WHEEL

CROSS-REFERENCE TO RELATED APPLICATION

This application claims the benefit of Korean Patent Application No. 10-2012-0141875 filed on Dec. 7, 2012, with the Korean Intellectual Property Office, the disclosure of which is incorporated in its entirety herein by reference.

FIELD OF THE INVENTION

The present invention relates to a passively transformable wheel which keeps a circular wheel shape on a flat surface and which, upon encountering an obstacle, transforms to a legged wheel by merely making contact with the obstacle without having to use an actuator, and a robot provided with the wheel.

BACKGROUND OF THE INVENTION

Typically, small robots having round wheels can run through a narrow clearance and may be efficient in searching a survivor in a place such as a collapsed building or finding an enemy base during a military operation.

However, a small robot that uses round wheels cannot climb an obstacle taller than the radius of the round wheels.

As an alternative, legged-wheel robots have been proposed for their better climbing performance. However, such legged-wheel robots have poor driving performance on flat surfaces since their center of mass is vertically changed.

Thus, there have been proposed robots having transformable wheels which can drive with round wheels on flat surfaces and can climb an obstacle with legged wheels.

As one background art of the present invention, there is disclosed an exploration-purpose robot that includes a plurality of leg units for supporting a body unit and enabling the robot to walk, each of the leg units including a calf portion, a thigh portion and a plurality of drive joints. The exploration-purpose robot further includes a control unit for operating and controlling the joints of the leg units. The calf portion of each of the leg units is provided with a foot for walking at one longitudinal end thereof. A ball caster for wheel driving is provided at one side of the calf portion. A rotating joint means for selectively operating the foot and the ball caster is provided at the center of the calf portion.

However, the exploration-purpose robot is merely designed to enhance the moving efficiency by freely selecting a foot's rolling operation and a ball caster's sliding operation depending on the walking environment of the robot. Since the wheel-driving-purpose ball caster used as a moving means exists in the calf portion, the ball caster serving as a wheel cannot passively transforms in conformity with the shape of a terrain. Moreover, the exploration-purpose robot is very complex in configuration. It is therefore difficult to use the exploration-purpose robot in a small robot application.

As another background art of the present invention, there is disclosed a transformable wheel that can drive on flat surfaces and can climb stairs. The transformable wheel includes: a rim; a plurality of spokes installed inside the rim and fitted at one ends to the rim so that the free ends thereof can protrude outward of the rim; and a gear box. The gear box includes: a rim gear portion for delivering the power of a motor to the rim; a spoke gear portion for delivering the power of the motor to the spokes; and a movable gear portion disposed between the motor, the rim gear portion and the spoke gear portion so as to selectively mesh with the rim gear portion and the spoke gear portion.

In the transformable wheel cited above, the complex gear box including the motor-operated spoke gear portion for expanding the spokes outward of the rim is mounted to the wheel. Therefore, additional power needs to be used in order to drive the gear box. It is also impossible to automatically expand the spokes to adapt themselves to the terrain features.

That is to say, the transformable wheel cited above has a complex structure because of the use of a large number of parts, such as a displacing actuator and a rotating actuator, for driving the rim and expanding the spokes. A battery having a large capacity is needed to operate the displacing actuator and the rotating actuator. Therefore, the transformable wheel cited above is not suitable for use in small robots.

SUMMARY OF THE INVENTION

In view of the above, an embodiment of the present invention provides a passively transformable wheel which is not transformed by an actuator but passively transformed by the friction contact with a terrain or a road surface.

Furthermore, an embodiment of the present invention provides a robot provided with a passively transformable wheel which keeps a round wheel shape when driving on a flat surface and which can be transformed into a legged-wheel shape with a trigger leg and a plurality of passive legs frictionally unfolded when climbing the obstacle. In accordance with an aspect of the present invention, there is provided a passively transformable wheel, which includes: a wheel base including a centrally positioned transmitter rotation shaft, a trigger leg rotation shaft positioned in an outer periphery of the wheel base and one or more passive leg rotation shafts positioned in the outer periphery of the wheel base; a force transmitter rotatably coupled to an end of the transmitter rotation shaft, the force transmitter including a trigger slide and one or more passive leg joints spaced apart from one another; a trigger leg arranged between the wheel base and the force transmitter and rotatably coupled to the trigger leg rotation shaft, the trigger leg including a trigger joint fitted to the trigger slide; and one or more passive legs arranged between the wheel base and the force transmitter so as not to interfere with the trigger leg and rotatably coupled to the passive leg rotation shafts, the passive legs including one or more passive leg slides engaging with the passive leg joints of the force transmitter.

Further, wherein, when the trigger leg is unfolded by the frictional contact with a road surface, the trigger joint is configured to rotate the force transmitter through the trigger slide of the force transmitter, and upon rotation of the force transmitter, the passive leg joints of the force transmitter are configured to rotate and unfold the passive legs through the passive leg slides of the passive legs.

Further, each of the trigger leg and the passive legs further includes a grip portion coupled to an inner surface and an outer surface thereof.

Further, the passive legs include: a first passive leg arranged between the wheel base and the force transmitter so as not to interfere with the trigger leg and rotatably coupled to a first passive leg rotation shaft of the wheel base, the first passive leg provided with a first passive leg slide engaging with a first passive leg joint of the force transmitter; and a second passive leg arranged between the first passive leg and the trigger leg and rotatably coupled to a second passive leg rotation shaft, the second passive leg provided with a second passive leg slide engaging with a second passive leg joint of the force transmitter.

Further, each of the trigger slide and the passive leg slides includes a first side portion formed of one half portion of an arc corresponding to a moving path of the trigger joint or a moving path of each of the passive leg joints of the force transmitter; and a second side portion formed of the other half portion of the arc.

Further, the first side portion and the second side portion of each of the trigger slide and the passive leg slides has a curvature identical with a curvature of the arc corresponding to the moving path of the trigger joint or the moving path of each of the passive leg joints of the force transmitter.

Further, a resilient member for returning the trigger leg and the passive legs unfolded into a legged-wheel shape to an original round shape is coupled to at least one of the trigger leg rotation shaft and the passive leg rotation shafts.

Further, the trigger leg includes: a link portion linearly extending toward the trigger slide such that the trigger joint is inserted into the trigger slide; a bent portion unitarily formed with the link portion and coupled to the trigger leg rotation shaft of the wheel base; and a support portion extending from the bent portion along a contour line of the passively transformable wheel, the trigger joint protruding from a side surface of the link portion of the trigger leg.

Further, each of the passive legs includes: a link portion linearly extending toward a base portion of each of the passive leg joints such that each of the passive leg slides of the passive legs engages with each of the passive leg joints of the force transmitter; a bent portion unitarily formed with the link portion and coupled to each of the passive leg rotation shafts of the wheel base; and a support portion extending from the bent portion along a contour line of the passively transformable wheel, each of the passive leg slides formed into a groove or hole shape on a side surface of the link portion of each of the passive legs.

Further, the trigger leg and the passive legs include flat portions respectively formed at a distal end of the trigger leg, on an outer surface of a support portion of the trigger leg and on an outer surface of a support portion of each of the passive legs.

In accordance with another aspect of the present invention, there is provided a passively transformable wheel in which a plurality of joints and a plurality of slides are asymmetrically installed in a trigger leg, a plurality of passive legs and a force transmitter, one of the joints is provided in the trigger leg, the remaining joints provided in the force transmitter, one of the slides provided in the force transmitter, and the remaining slides respectively provided in the passive legs, wherein, when the trigger leg is unfolded by the frictional contact with a road surface, one of the trigger joints is configured to rotate the force transmitter through the slide of the force transmitter, and upon rotation of the force transmitter, the remaining joints of the force transmitter are configured to rotate and unfold the passive legs through the slides of the passive legs.

In accordance with further another aspect of the present invention, there is provided a robot provided with the passively transformable wheel, the robot including: a body unit in which a circuit unit for controlling the robot is installed; a frame unit positioned in front of the body unit and provided with a motor unit for driving the passively transformable wheel; and a connecting unit for interconnecting the body unit and the frame unit.

Further, the robot further includes a shock absorbing unit for absorbing a shock transmitted from the passively transformable wheel toward the body unit.

Further, the shock absorbing unit includes: a shock absorbing shaft coupled to a support plate of the frame unit; and a shock absorbing member coupled to the shock absorbing shaft so as to resiliently support a wing portion of a motor mount vertically movable along the shock absorbing shaft.

Further, the connecting unit includes: a hinge bracket installed in a support plate of the frame unit; a hinge projection installed in a plate of the body unit; a connecting shaft for rotatably interconnecting the hinge bracket and the hinge projection; and a stopper for supporting the plate of the body unit so that the support plate and the plate can make rotation within a limited angular extent.

As set for the above, the passively transformable wheel of the present embodiment has a simple structure in which the trigger leg and the passive legs are frictionally unfolded. It is therefore possible to reduce the number of parts and the manufacturing costs. This helps simplify the manufacturing process and enable mass production.

The robot provided with the passively transformable wheel is capable of significantly increasing its efficiency when used as swarm robots for performing search and rescue missions. Thus, the robot can be advantageously used as swarm robots through mass production.

The robot provided with the passively transformable wheel can rapidly drive on a flat surface with its round wheel shape. In a rough terrain where an obstacle exists, the trigger leg and the passive legs are frictionally unfolded, whereby the wheel is transformed into a legged-wheel shape. Thus, the robot capable of passing through a narrow clearance can be efficiently used in searching a survivor in a place such as a collapsed building or finding an enemy base during a military operation.

The robot provided with the passively transformable wheel is configured such that the motor unit drives the passively transformable wheel and such that the trigger leg and the passive legs are frictionally unfolded. Thus, the robot of the present invention consumes a small amount of power as compared with a conventional robot in which additional actuators are used for driving and unfolding purposes.

BRIEF DESCRIPTION OF THE DRAWINGS

The above and other objects and features of the present invention will become apparent from the following description of the embodiments given in conjunction with the accompanying drawings.

FIGS. 10A to 10C are views schematically showing the states of steps 1 and 2 shown in FIG. 9 and a modified example of the passively transformable wheel.

DETAILED DESCRIPTION OF THE EMBODIMENTS

Figure 1:
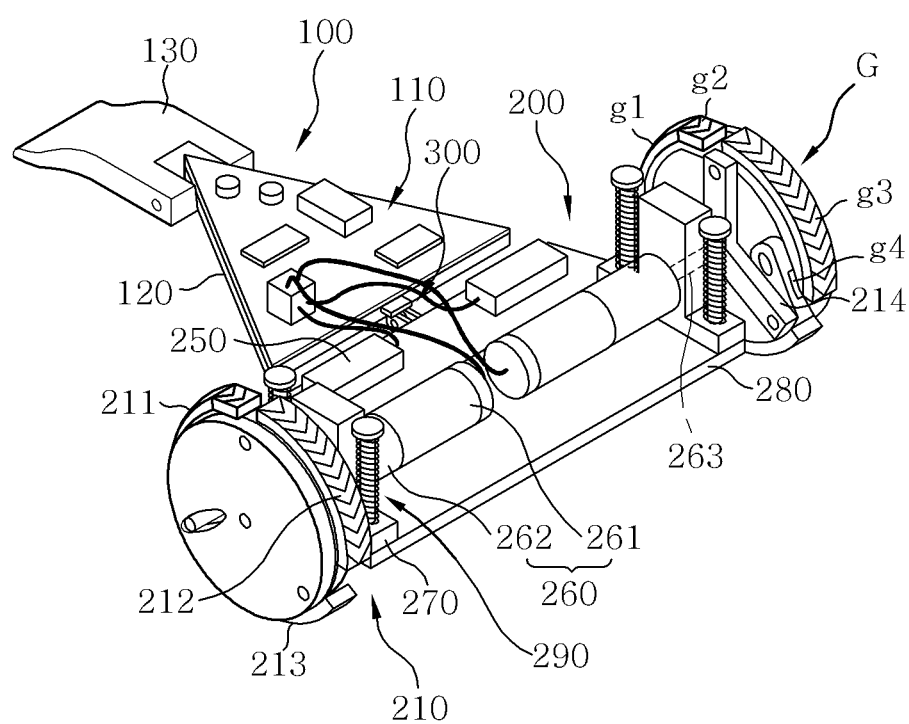
FIG. 1 is a perspective view showing a robot provided with a passively transformable wheel according to one embodiment of the present disclosure.

Hereinafter, the embodiments of the present invention will be described in detail with reference to the accompanying drawings. In the following description, when the detailed description of the relevant known function or configuration is determined to unnecessarily obscure the important point of the present invention, the detailed description will be omitted. Also, in the specification, each number used herein is merely reference numeral for differentiating one element from the other elements. in particular, the present embodiment can be applied to a perform inspection apparatus referred to in the Background of the Invention. Thus, the configurations understandable from the background art or similar to the background art may be omitted in the description of the present embodiment.

In the description of the present embodiment, different kinds of slides may be formed into a hole shape of a groove shape. Different kinds of joints may be pins or pin-shaped protruding members fitted to the slides.

The term "passively" of the passively transformable wheel used in the description on the present embodiment means that an operation is not artificially made by a man but passively performed by the torque induced by the trigger leg, or that the unfolding and folding of the legs are frictionally induced without having to use a motor or an actuator.

In the description on the present embodiment, the term "road surface" means all surfaces such as a driving surface and a friction surface and may mean a surface with which the passively transformable wheel makes contact, such as a bottom surface around an obstacle and a side surface.

In the drawings, FIG. 1 is a perspective view showing a robot provided with a passively transformable wheel according to one embodiment of the present disclosure.

Referring to FIG. 1, the robot provided with the passively transformable wheel of the present invention includes a body unit 100 on which a circuit unit 110 for controlling the robot is installed, a frame unit 200 to which one or more passively transformable wheels 210 are attached, and a connecting unit 300 (see FIG. 13) which interconnects the body unit 100 and the frame unit 200.

The body unit 100 includes a circuit unit 110, a plate 120 and an end support member 130.

The circuit unit 110 is composed of an electronic circuit element for controlling the overall operations (e.g., driving, communication and tracking) of the robot.

For example, the circuit unit 110 is operated by the electric power of a power supply unit 250 (e.g., a lithium ion battery) and can control the rotation of output shafts of motor units 260 that provide driving power to the passively transformable wheels 210.

The motor units 260 are provided in a corresponding relationship with the passively transformable wheels 210. That is to say, the output shafts of the respective motor units 260 serve to drive the passively transformable wheels 210.

The motor units 260 may be geared motors. For example, each of the motor units 260 includes a motor 261 (e.g., a DC motor) connected to the circuit unit 110 via an electric wire and a gear box 262 coupled to the motor 261 so that the gear box 262 can rotate the output shaft by adjusting the revolution number of the motor 261 in conformity with a predetermined speed reduction gear ratio. In this regard, the output shaft is a output rotation shaft of the gear box 262 and is connected to the center of a side surface of a Y-shaped wheel base 214 of each of the passively transformable wheels 210 so that the output shaft can transmit torque to the wheel base 214.

The plate 120 may be a plate-shaped structure to which the circuit unit 110 is attached.

The end support member 130 is coupled to the rear end portion of the plate 120. The end portion of the end support member 130 opposite to the coupled end portion thereof makes contact with a road surface and may serve to support the body unit 100. In this regard, the end support member 130 may be replaced by a ball caster, a trailing wheel or the like. The end support member 130 is rotatably connected to the rear end portion of the plate 120 and is provided with a stopper (not shown). When kept in a horizontal state, the end support member 130 can be folded downward about the connection portion but cannot be folded upward.

The frame unit 200 includes a passively transformable wheel 210 which drives on a flat surface with a round wheel shape and transforms into a legged-wheel shape by unfolding a trigger leg 211 and passive legs 212 and 213 when making frictional contact with a protruding terrain, a pair of motor mounts 270 to which the motor units 260 for rotating the passively transformable wheel 210 are mounted, a support plate 280 positioned below the motor mount 270, and a shock absorbing unit 290 (see FIG. 12) having a suspension-like configuration so that the shock absorbing unit 290 can resiliently support the motor mounts 270 on the support plate 280.

The motor units 260 can be positioned in the front region of the upper surface of the support plate 280. The power supply unit 250 can be positioned in the rear region of the upper surface of the support plate 280.

Each of the trigger leg 211 and the passive legs 212 and 213 may further include a grip portion G fixed to the inner and outer surface of each of the trigger leg 211 and the passive legs 212 and 213. The grip portion G can be made of a material, e.g., rubber, which is larger in frictional coefficient than the material of the trigger leg 211 and the passive legs 212 and 213. The grip portion G serves to efficiently transmit the friction with a road surface to each of the trigger leg 211 and the passive legs 212 and 213. The grip portion G includes a fixing portion g4 bent inward at one end of each of the trigger leg 211 and the passive legs 212 and 213.

Figure 2:
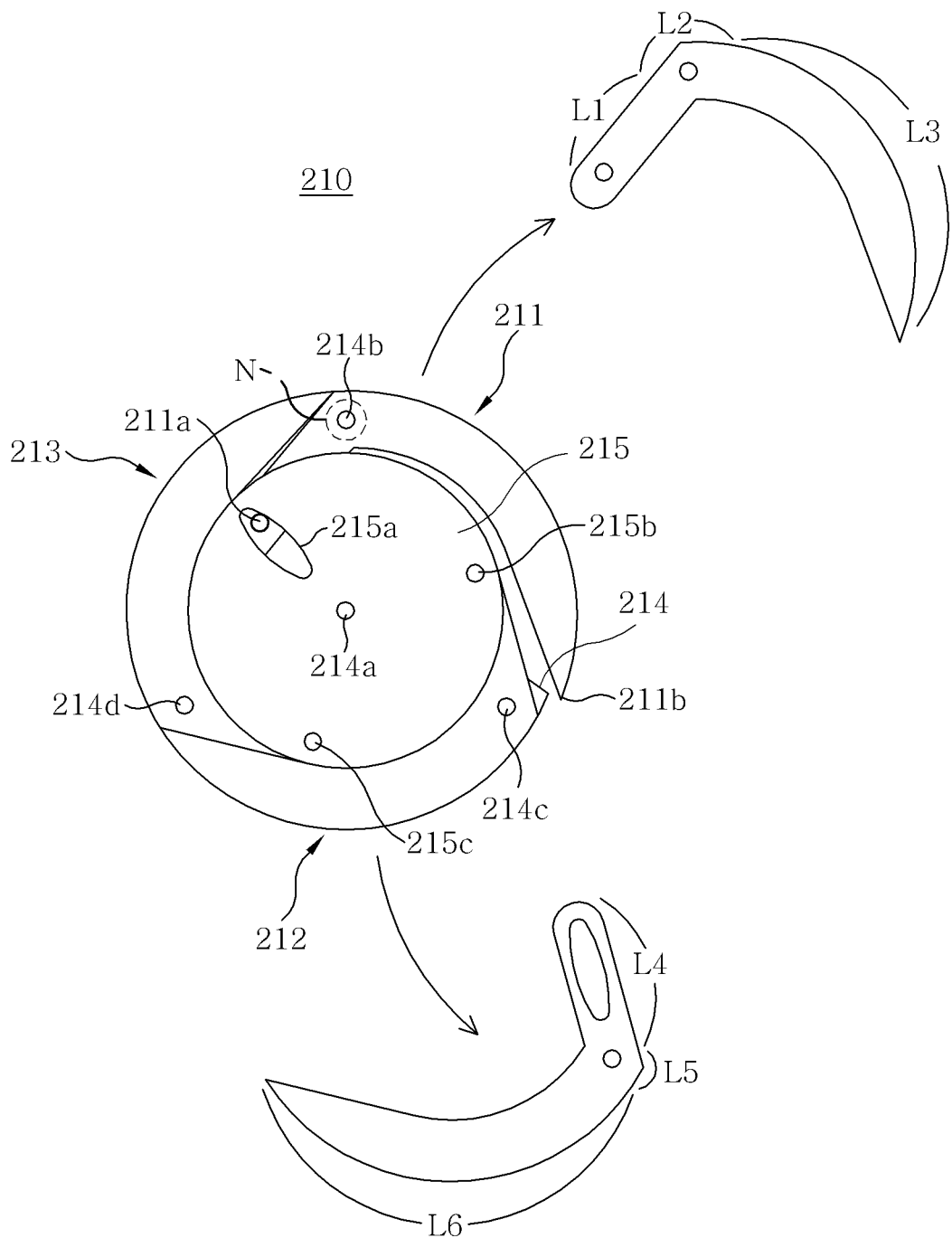
FIG. 2 is a front view of the passively transformable wheel shown in FIG. 1.
Figure 3:
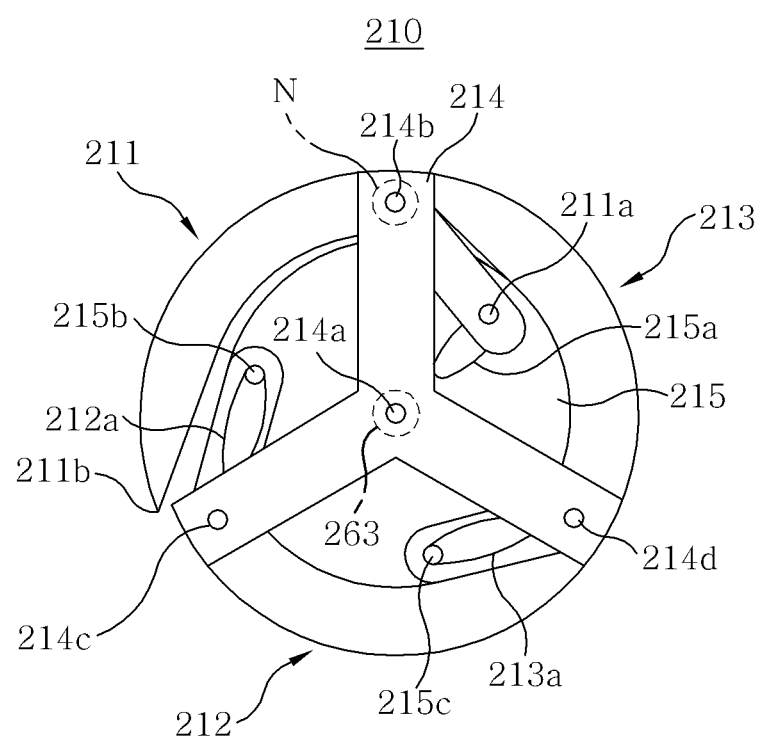
FIG. 3 is a rear view of the passively transformable wheel shown in FIG. 2.

FIG. 2 is a front view of the passively transformable wheel shown in FIG. 1. FIG. 3 is a rear view of the passively transformable wheel shown in FIG. 2.

Referring to FIGS. 2 and 3, the passively transformable wheel 210 includes a wheel base 214, a force transmitter 215, a single trigger leg 211 and one or more passive legs 212 and 213.

The passively transformable wheel 210 may be composed of one trigger leg 211 and one passive leg (not shown) as long as the load of the motor units 260 permits. In a broader design, the passive legs 212 and 213 may be two or more. In the following description, it is assumed that the passively transformable wheel 210 includes one trigger leg 211 and two passive legs 212 and 213.

The passively transformable wheel 210 includes one or more (e.g., three) legs 211, 212 and 213, more specifically, a trigger leg 211 and first and second passive legs 212 and 213, which serve as a wheel and as legs. In this regard, the legs 211, 212 and 213 are connected to one another through the force transmitter 215. Thus, the passively transformable wheel 210 has one degree of freedom as a whole. The connection portion of the legs 211, 212 and 213 may be configured by a linkage system which includes joints 211a, 215b and 215c and slides 212a, 213a and 215a.

Hereinafter, the passively transformable wheel 210 will be described in more detail.

The wheel base 214 is a Y-shaped member and is connected to one end of the output shaft 263 of the motor unit 260 shown in FIG. 1.

That is to say, the wheel base 214 plays a role of positioning the remaining components in right positions and a role of connecting the passively transformable wheel 210 to the output shaft 263 of the motor unit 260.

In this regard, one end of the output shaft 263 of the motor unit 260 is connected to the central region of one side surface of the wheel base 214. One end of the output shaft 263 of the motor unit 260 and the central region of one side surface of the wheel base 214 can be connected in the following manner. For example, if the output shaft 263 has a flange (not shown) with bolt holes at one end thereof and if fastening holes (not shown) aligned with the bolt holes of the flange of the output shaft 263 are formed in the central region of one side surface of the wheel base 214, the output shaft 263 and the wheel base 214 can be connected by bolts. Alternatively, just like the thread coupling of ordinary rotation shafts, the output shaft 263 may have an end thread portion (not shown) threadedly coupled to a thread hole (not shown) of the wheel base 214. However, the present invention is not limited thereto.

At the center of the other surface of the wheel base 214, there is a transmitter rotation shaft 214a coupled to a central hole of the force transmitter 215 so as to rotatably support the force transmitter 215. The end of the transmitter rotation shaft 214a and the central hole of the force transmitter 215 are rotatably coupled to each other by an ordinary rotator coupling means (not shown) such as a bearing, a stopper ring and a ring groove.

A plurality of leg rotation shafts 214b, 214c and 214d protruding in the same direction as the protruding direction of the transmitter rotation shaft 214a is formed in the outer end regions of the other surface of the wheel base 214 (e.g., in the distal end portions of the Y-shaped wheel base 214).

In this connection, the leg rotation shafts 214b, 214c and 214d may be referred to as a trigger leg rotation shaft 214b and first and second passive leg rotation shafts 214c and 214d.

The respective leg rotation shafts 214b, 214c and 214d are fitted to the rotation holes of bent leg portions L2 and L5 of the trigger leg 211 and the passive legs 212 and 213. That is to say, trigger leg 211 and the passive legs 212 and 213 are coupled to the respective leg rotation shafts 214b, 214c and 214d so as to rotate about the leg rotation shafts 214b, 214c and 214d.

The force transmitter 215 is a disc-shaped plate member and is rotatably coupled to the end of the transmitter rotation shaft 214a of the wheel base 214.

In this regard, a leg arrangement space having a size corresponding to the axial length of the transmitter rotation shaft 214a is formed between the force transmitter 215 and the wheel base 214.

In the leg arrangement space between the force transmitter 215 and the wheel base 214, the trigger leg 211 and the passive legs 212 and 213 are arranged along the circumferential direction so as not to interfere with one another.

A central hole to which the end of the transmitter rotation shaft 214a of the wheel base 214 is formed at the center of the force transmitter 215.

A trigger slide 215a, a first joint 215b and a second joint 215c are arranged in the force transmitter 215 in a spaced-apart relationship with one another. That is to say, the trigger slide 215a, the first joint 215b and the second joint 215c are arranged around the central hole of the force transmitter 215 and are spaced apart from one another by a predetermined angle (e.g., 120 degrees).

The trigger slide 215a may be a generally elliptical slot extending in the radial direction of the force transmitter 215 between the central hole of the force transmitter 215 and the outer circumferential surface of the force transmitter 215.

The first joint 215b and the second joint 215c may serve to simultaneously transmit the torque of the force transmitter 215 to the respective passive legs 212 and 213 through the first and second slides 212a and 213a.

The trigger leg 211 is arranged between the wheel base 214 and the force transmitter 215 and is rotatably coupled to the trigger leg rotation shaft 214b of the wheel base 214. The trigger leg 211 includes a trigger joint 211a inserted into the trigger slide 215a of the force transmitter 215.

In this regard, the trigger leg 211 includes a link portion L1 linearly extending toward the trigger slide 215a so that the trigger joint 211a can be inserted into the trigger slide 215a, a bent portion L2 unitarily formed with the link portion L1 and coupled to the trigger leg rotation shaft 214b, and a support portion L3 extending from the bent portion L2 along a contour line of the passively transformable wheel 210 (e.g., a contour line which defines the outer circumference of the passively transformable wheel 210 kept in a round wheel shape). The trigger joint 211a protrudes from the side surface of the link portion L1 of the trigger leg 211.

A playing gap exists between the trigger joint 211a of the trigger leg 211 and the trigger slide 215a of the force transmitter 215. Thus, the distal end 211b of the trigger leg 211 may partially protrude outward of the contour line of the passively transformable wheel 210 (e.g., the circumferential line extending from the outer circumferential surface of the first passive leg, or the partially straight and substantially circular contour line of the passively transformable wheel 210).

That is to say, a frictional force is generated if the outer surface of the trigger leg 211 makes contact with the side surface of an obstacle or if the end of the trigger leg 211 is caught by an obstacle during the rotation of the passively transformable wheel 210. This frictional force causes the trigger leg 211 to rotate about the trigger leg rotation shaft 214b which is a connecting point of the trigger leg 211 and the wheel base 214. The rotation of the trigger leg 211 results in the rotation of the force transmitter 215. At the same time, the first and second passive legs 212 and 213 also rotate about the first and second passive leg rotation shafts 214c and 214d.

That is to say, the trigger joint 211a of the trigger leg 211 transmits the torque generated by the rotation of the trigger leg 211 to the force transmitter 215 through the trigger slide 215a. At this time, the trigger slide 215a is off-centered from the transmitter rotation shaft 214a of the wheel base 214. As a result, the force transmitter 215 can rotate about the transmitter rotation shaft 214a of the wheel base 214.

Since the first joint 215b and the second joint 215c of the force transmitter 215 thus rotated are also off-centered from the transmitter rotation shaft 214a of the wheel base 214, the first joint 215b and the second joint 215c can rotate about the transmitter rotation shaft 214a of the wheel base 214.

At the same time, the first joint 215b and the second joint 215c rotated by the torque of the passively transformable wheel 210 transmits the torque of the force transmitter 215 to the respective passive legs 212 and 213 through the first and second slides 212a and 213a. Consequently, the respective passive legs 212 and 213 can be unfolded.

In particular, the first passive leg 212 of the two passive legs 212 and 213 is positioned after the trigger leg 211 along the circumferential direction of the passively transformable wheel 210.

The first passive leg 212 is positioned between the wheel base 214 and the force transmitter 215 so as not to interfere with the trigger leg 211 and is rotatably coupled to the first passive leg rotation shaft 214c of the wheel base 214. In this regard, the first passive leg 212 has a first slide 212a for engagement with the first joint 215b.

The first passive leg 212 includes a link portion L4 linearly extending toward the base portion of the first joint 215b so that the first slide 212a can engage with the first joint 215b, a bent portion L5 unitarily formed with the link portion L4 and coupled to the first passive leg rotation shaft 214c, and a support portion L6 extending from the bent portion L5 along a contour line of the passively transformable wheel 210. In this regard, the first slide 212a may be formed on the side surface of the link portion L4 of the first passive leg 212.

The second passive leg 213 of the two passive legs 212 and 213 is positioned between the first passive leg 212 and the trigger leg 211.

The second passive leg 213 is arranged between the wheel base 214 and the force transmitter 215 and is rotatably coupled to a second passive leg rotation shaft 214d of the wheel base 214. In this regard, the second passive leg 213 has a second slide 213a for engagement with the second joint 215c.

The second passive leg 213 may have an identical or similar configuration to the configuration of the first passive leg 212. For example, the second passive leg 213 includes a link portion linearly extending toward the base portion of the second joint 215c so that the second slide 213a can engage with the second joint 215c, a bent portion unitarily formed with the link portion and coupled to the second passive leg rotation shaft 214d, and a support portion extending from the bent portion along a contour line of the passively transformable wheel 210. In this regard, the second slide 213a is formed on the side surface of the link portion of the second passive leg 213.

The support portions L3 and L6 of the trigger leg 211 and the first and second passive legs 212 and 213 can serve to provide rolling surfaces which make contact with a road surface a flat surface around an obstacle when the passively transformable wheel 210 has a round wheel shape, or can serve to walk on a road surface or to climb an obstacle when the passively transformable wheel 210 has a legged-wheel shape.

An resilient member N (e.g., a torsion spring or the like) for returning the unfolded trigger leg 211 having a legged-wheel shape to an original round shape (e.g., a folded shape) is coupled to the trigger leg rotation shaft 214b.

That is to say, the trigger leg 211 and the first and second passive legs 212 and 213 are unfolded into a legged-wheel shape against the biasing force of the resilient member N by the torque which is generated by the friction with the side surface of an obstacle. If the passively transformable wheel 210 climbs an obstacle and then drives on a flat surface, the torque acting on the trigger leg 211 is reduced or removed. Thus, the passively transformable wheel 210 returns to the original round wheel shape, thereby coming into a folded state. The resilient member N is installed by a conventional torsion spring installation method. That is to say, the resilient member N has a coil-shaped portion fitted to the trigger leg rotation shaft 214b. One end of the resilient member N is connected to the trigger leg 211 and the other end of the resilient member N is connected to the wheel base 214.

After the passively transformable wheel 210 climbs an obstacle, the resilient member N automatically returns the trigger leg 211 to the original position, whereby the force transmitter 215 and the first and second passive legs 212 and 213 can return to the original positions.

Figure 4:
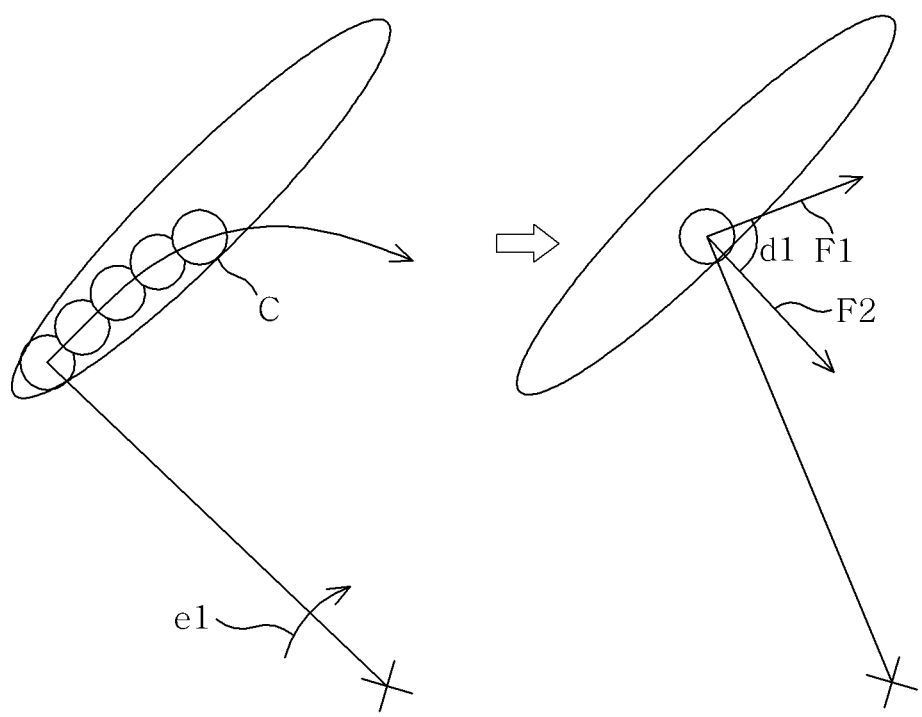
FIG. 4 is a view showing a structure in which a joint rotates a slide.
Figure 5:
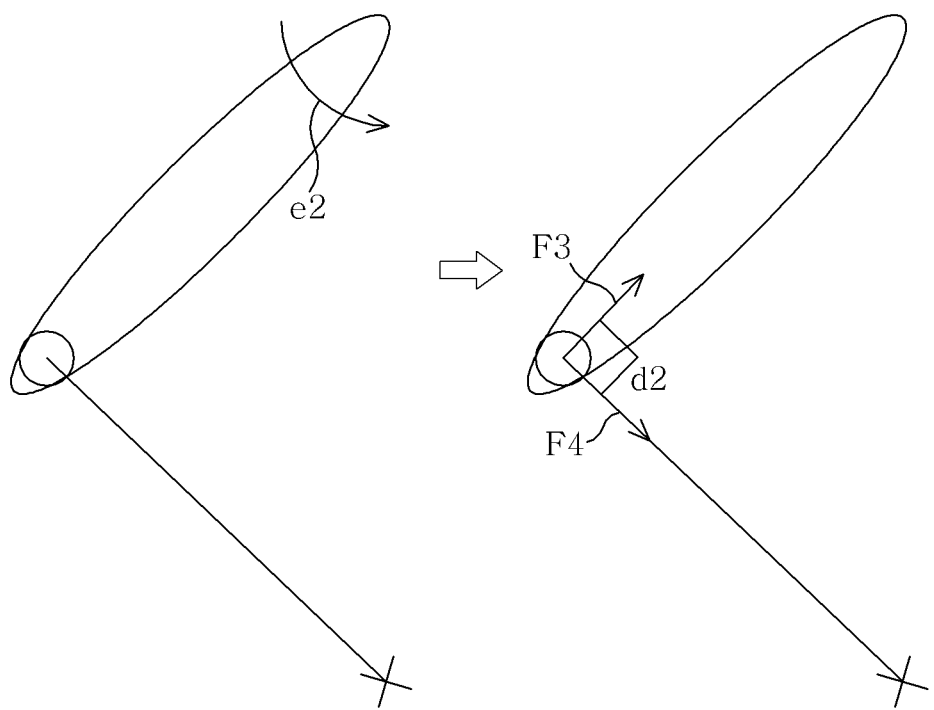
FIG. 5 is a view showing a structure in which the slide rotates the joint.

FIG. 4 is a view showing a structure in which the joint rotates the slide. FIG. 5 is a view showing a structure in which the slide rotates the joint.

Referring to FIG. 4, reference symbol e1 designates the acting direction of joint torque. A first arrow F1 indicates the joint torque acting about a center (e.g., a leg rotation shaft). A second arrow F2 indicates the direction in which the slide has to be rotated. When the joint begins to rotate the slide, the initial contact point C of the joint and the slide is positioned in the middle region of the slide. At this contact point C, the angle d1 between the first arrow F1 and the second arrow F2 is smaller than 90 degrees. Accordingly, the joint torque acts in the direction in which the slide has to be rotated. Thus, the joint can rotate the slide.

Referring to FIG. 5, reference symbol e2 designates the acting direction of the slide torque. A third arrow F3 indicates the direction in which the joint has to be rotated. A fourth arrow F4 indicates the slide torque. When the slide begins to rotate the joint, the angle d2 between the third arrow F3 and the fourth arrow F4 is equal to 90 degrees. Thus, the slide torque does not act in the direction in which the joint has to be rotated. For that reason, the slide cannot rotate the joint. Since there is required a force quite larger than the force by which the joint rotates the slide, the link system may be broken.

When the angle between the third arrow F3 and the fourth arrow F4 made at the start section and end section of the rotation is equal to 90 degrees, the strain of the passively transformable wheel becomes largest. Thus, it can be appreciated that the structure in which the slide rotates the joint is not suitable for the design of the passively transformable wheel of the present embodiment.

Figure 6:
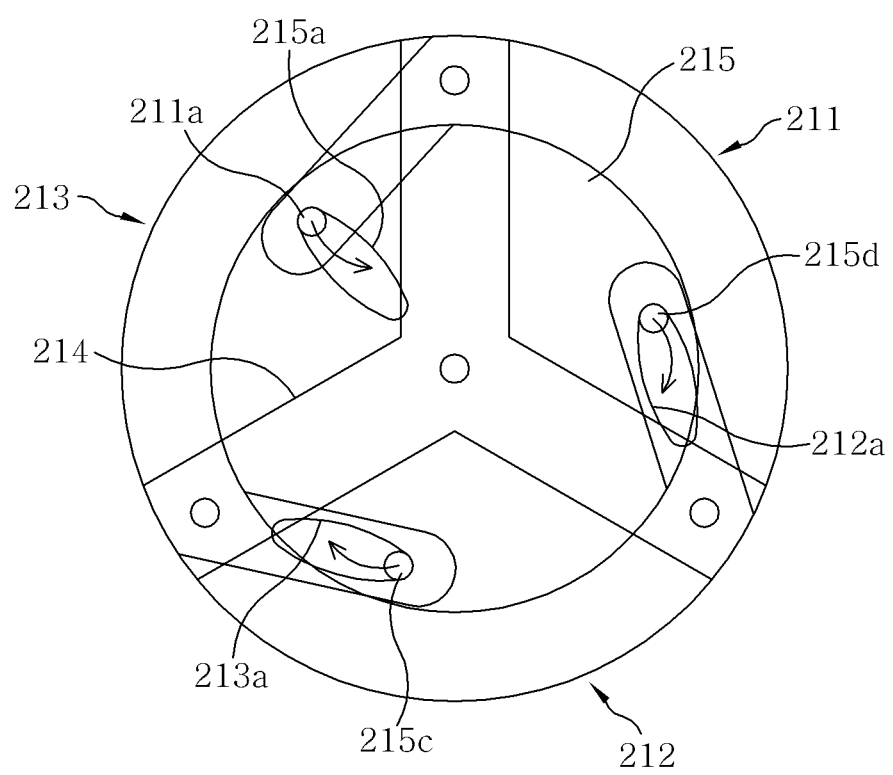
FIG. 6 is a transparent front view showing an arrangement structure of the joints and slides of the trigger leg and the passive legs.

FIG. 6 is a transparent front view showing an arrangement structure of the joints and slides of the trigger leg and the passive legs.

Referring to FIG. 6, one of the features of the present embodiment resides in that three joints 211a, 215b and 215c and three slides 212a, 213a and 215a are asymmetrically installed in three legs 211, 212 and 213 and one force transmitter 215.

That is to say, one of the three joints 211a, 215b and 215c, namely the trigger joint 211a, is installed in the trigger leg 211. The remaining two joints, namely the first and second joints 215b and 215c, are installed in the force transmitter 215. One of the three slides 212a, 213a and 215a, namely the trigger slide 215a, is installed in the force transmitter 215. The remaining two slides, namely the first and second slides 212a and 213a, are installed in the passive legs 212 and 213. Thus, the respective joints 211a, 215b and 215c rotate the respective slides 212a, 213a and 215a at three connection points of the joints 211a, 215b and 215c and the slides 212a, 213a and 215a.

Figure 7A:
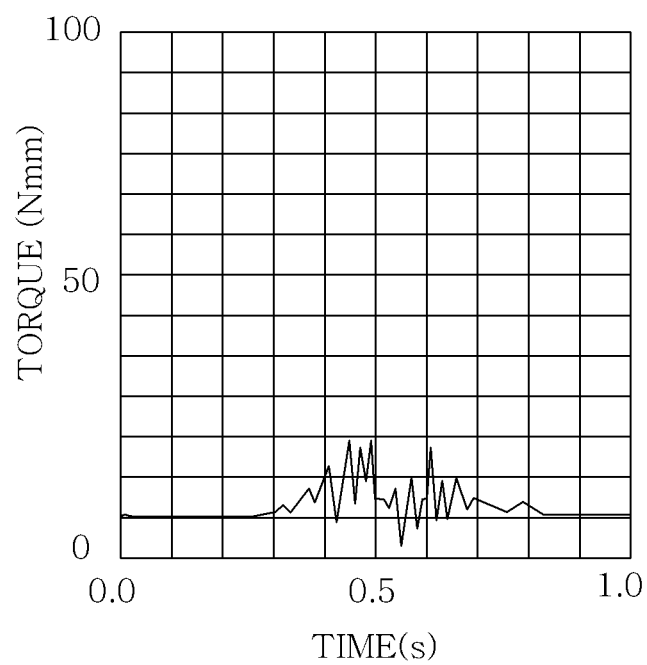
FIGS. 7A and 7B are graphs plotting the force required for the joint to rotate the slide and the force required for the slide to rotate the joint.
Figure 7B:
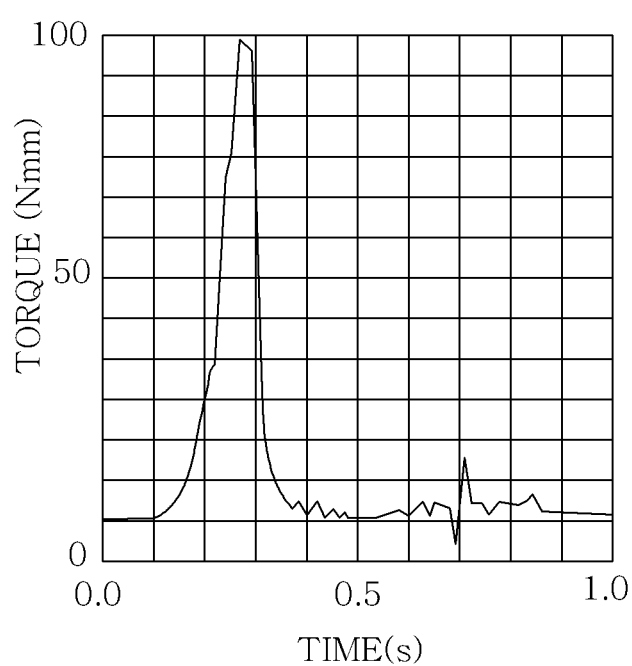

FIGS. 7A and 7B are graphs plotting the force required for the joint to rotate the slide and the force required for the slide to rotate the joint.

The graphs shown in FIGS. 7A and 7B are obtained by a simulation where was conducted to analyze the torque required in a structure in which the joint rotates the slide and the torque required in a structure in which the slide rotates the joint. The simulation result reveals that, as mentioned above, the structure in which the joint rotates the slide is more suitable for the design of the passively transformable wheel than the structure in which the slide rotates the joint.

That is to say, FIG. 7A indicates the torque required in the structure in which the joint rotates the slide. FIG. 7B indicates the torque required in the structure in which the slide rotates the joint.

For example, the maximum torque in FIG. 7A is 20 Nmm and the maximum torque in FIG. 7B is 100 to 120 Nmm.

Many experiments conducted by the present inventor reveal that an I-shaped slide interferes with the moving direction of a joint. This means that the I-shaped slide is not suitable for the rotational movement of the components of the passively transformable wheel.

In the present embodiment each of the slides 212a, 213a and 215a shown in FIGS. 2, 3 and 6 has an arc shape such that the torque required in transforming the passively transformable wheel becomes smallest.

FIGS. 8A to 8D are views showing the moving path of the joint and the slide identical in curvature with the joint.

Figure 8A:
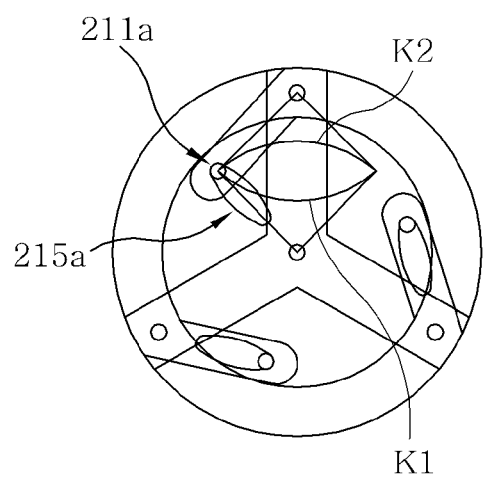
FIGS. 8A to 8D are views showing the moving path of the joint and the slide identical in curvature with the joint.
Figure 8B:
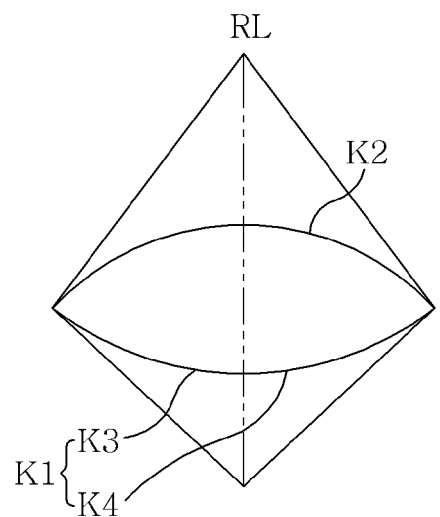
Figure 8C:
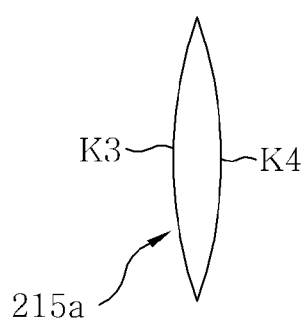
Figure 8D:
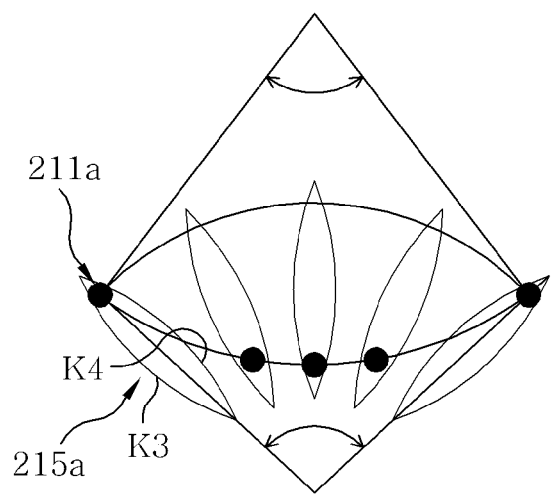

Referring to FIGS. 8A to 8D, a first arc K1 in FIG. 8A indicates the moving path of the joint (e.g., the trigger joint 211a or the first or second joint). A second arc K2 indicates the moving path of the slide (e.g., the trigger slide 215a or the first or second slide). As shown in FIG. 8B, the first arc K1 can be divided by a reference line RL into a third arc K3 corresponding to one side of the slide and a fourth arc K4 corresponding to the other side of the slide. In this case, each of the third arc K3 and the fourth arc K4 corresponds to one half of the first arc K1 which is the moving path of the joint.

That is to say, one half portion of the arc (e.g., the first arc K1) corresponding to the moving path of the joint constitutes one side portion of the slide. The other half of the arc constitutes the other side portion of the slide. The curvature of one half portion and the other half portion of the slide is identical with the curvature of the first arc K1 which is the moving path of the joint.

Accordingly, during rotation, the joint moves radially inward of the slide and makes contact with the slide. This makes it possible to rotate the force transmitter and the passive legs which are provided with the slides.

Figure 9:
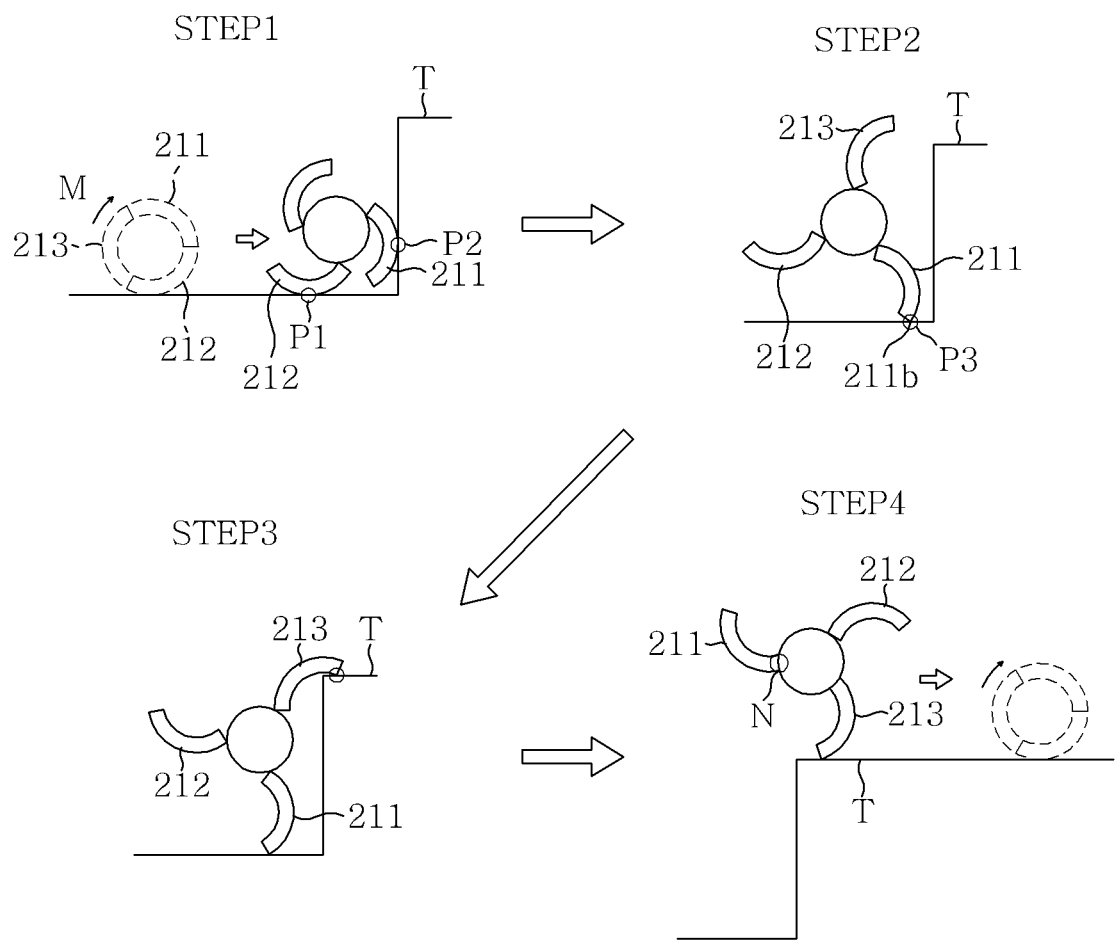
FIG. 9 is view schematically showing the passively transformable wheel that climbs an obstacle.

FIG. 9 is view schematically showing the passively transformable wheel that climbs an obstacle. FIGS. 10A to 10C are views schematically showing the states of steps 1 and 2 shown in FIG. 9 and a modified example of the passively transformable wheel.

Referring to FIGS. 9 and 10, the present embodiment is most useful in climbing an obstacle T, such as a stair or the like, whose flank surface is vertical to a ground surface.

In the present embodiment, no actuator is used to unfold the legs 211, 212 and 213. The passively transformable wheel is transformed from a round wheel shape to a legged-wheel shape only by virtue of the friction between the wheel and the obstacle. The passively transformable wheel can be transformed from the legged-wheel shape to the round wheel shape by means of the resilient member N.

In step 1 of FIG. 9, the passively transformable wheel indicated by dot line drives or rotates in the direction M and encounters an obstacle T. In FIG. 9, a first obstacle contact point P1 indicates the contact point between the first passive leg 212 and the ground surface. A second obstacle contact point P2 indicates the contact point between the trigger leg 211 and the flank surface of the obstacle. A third obstacle contact point P3 indicates the contact point between the distal end 211b of the trigger leg 211 and the ground surface.

In order to climb the obstacle T taller than the diameter f the passively transformable wheel, the passively transformable wheel should satisfy the condition that all the trigger leg 211 and the passive legs 212 and 213 are unfolded when the wheel comes into contact with the flank surface of the obstacle T.

In step 1, the passively transformable wheel makes initial contact with the obstacle T, in which state the legs 211, 212 and 213 begin to be unfolded at the first and second obstacle contact points P1 and P2.

In step 2, the distal end 211b of the trigger leg 211 is supported at the third obstacle contact point P3 with no slip, whereby all the legs 211, 212 and 213 are unfolded into a legged-wheel shape.

In steps 3 and 4, the passively transformable wheel climbs the obstacle T and then returns to a round wheel shape under the action of the resilient member N.

FIG. 10A schematically shows the state of step 1 of FIG. 9. FIG. 10B schematically illustrates the state of step 2 of FIG. 9. FIG. 10C depicts a modified example of the passively transformable wheel.

In general, the frictional forces Q2, Q4 and Q6 are generated by the vertical resistance forces Q1, Q3 and Q5 acting at the contact points. The vertical resistance force Q1 acting at the second obstacle contact point P2 is generated due to the reaction force of the frictional force Q4 acting at the first obstacle contact point P1. The frictional force Q6 acting at the third obstacle contact point P3 is generated by the torque of the motor unit and the weight of the passively transformable wheel.

If the contour line of the passively transformable wheel is circular, the passively transformable wheel makes unstable line-to-line contact with the road surface or the obstacle when seen three-dimensionally.

Referring to the modified example of the passively transformable wheel shown in FIG. 10C, for the sake of preventing such unstable contact, the trigger leg 211 and the first passive leg 212 further include flat portions g1, g2 and g3 (see FIG. 1) which are formed at the distal end 211b of the trigger leg 211, on the outer surface 211c of the support portion L3 (see FIG. 2) of the trigger leg 211 and on the outer surface 212b of the support portion L6 of the first passive leg 212.

That is to say, the flat portions g1, g2 and g3 are formed to increase the frictional force and to assure stable ground contact and may be a planar surface or a tread intentionally provided in the trigger leg 211 and the first passive leg 212.

Figure 11:
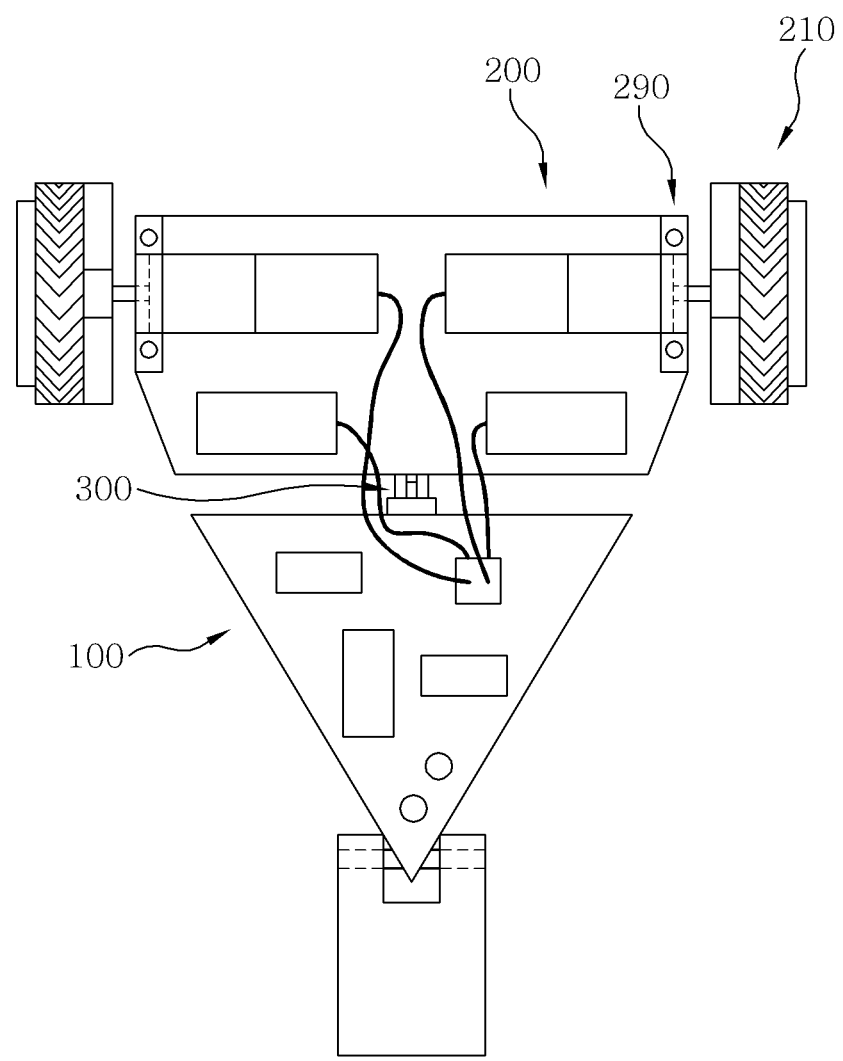
FIG. 11 is a plan view of the robot provided with the passively transformable wheel shown in FIG. 1.
Figure 12:
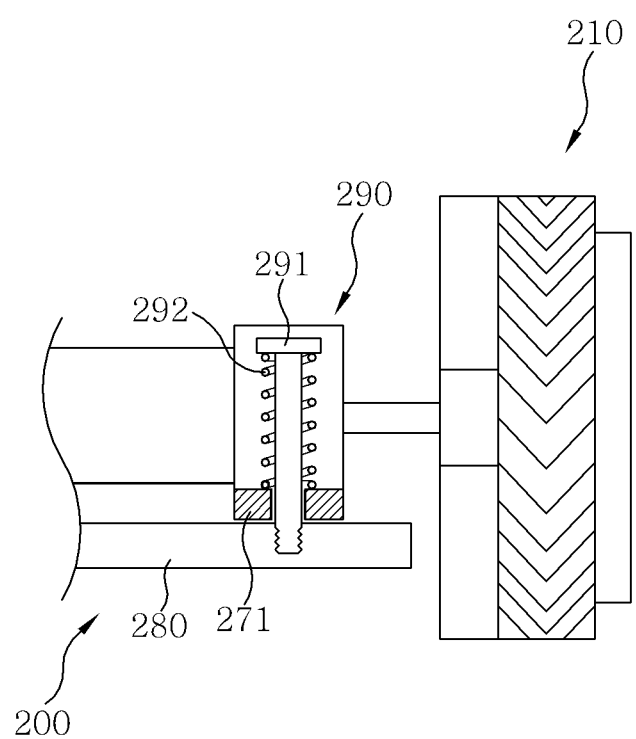
FIG. 12 is a view showing a shock absorbing unit shown in FIG. 11.
Figure 13:
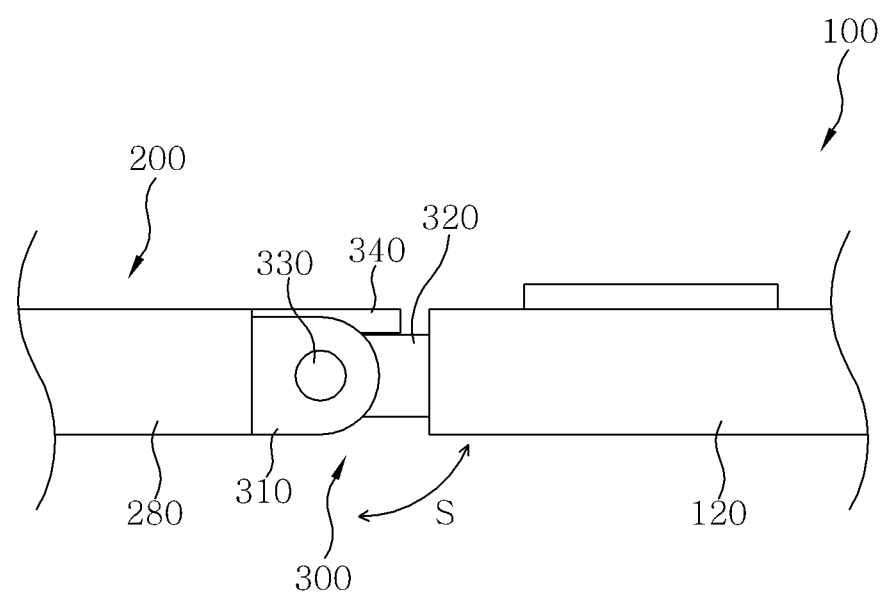
FIG. 13 is a view showing a connecting unit shown in FIG. 11.

FIG. 11 is a plan view of the robot provided with the passively transformable wheel shown in FIG. 1. FIG. 12 is a view showing a shock absorbing unit shown in FIG. 11. FIG. 13 is a view showing a connecting unit shown in FIG. 11.

Referring to FIG. 11, the robot provided with the passively transformable wheel of the present embodiment includes a body unit 100 on which a circuit unit 110 for controlling the robot is installed, a frame unit 200 positioned in front of the body unit 100, one or more passively transformable wheels 210 attached to the frame unit 200, and a connecting unit 300 which interconnects the body unit 100 and the frame unit 200.

The robot provided with the passively transformable wheel further includes a shock absorbing unit 290 for absorbing a shock transmitted from the passively transformable wheel 210 toward the body unit 100.

Referring to FIG. 12, the shock absorbing unit 290 includes a shock absorbing shaft 291 coupled to a support plate 280 of the frame unit 200, and a shock absorbing member 292 coupled to the shock absorbing shaft 291 so as to resiliently support a wing portion 271 of a motor mount 270 which can vertically move along the shock absorbing shaft 291. In this regard, the shock absorbing member 292 may be a spring, a shock absorber or a damper.

Referring to FIG. 13, the connecting unit 300 includes a hinge bracket 310 installed in the support plate 280 of the frame unit 200, a hinge projection 320 installed in a plate 120 of the body unit 100, a connecting shaft 330 for rotatably interconnecting the hinge bracket 310 and the hinge projection 320, and a stopper 340 for supporting the plate 120 so that the support plate 280 and the plate 120 can make rotation (S) within a limited angular extent.

In this connection, the hinge projection 320 is coupled to the hinge bracket 310 so that they can overlap with each other. The connecting shaft 330 is inserted into fastening holes formed in the overlapping portions of the hinge projection 320 and the hinge bracket 310. The stopper 340 protrudes at the upper side of the hinge bracket 310 to prevent upward rotation of the hinge projection 320.

With this connecting unit 300, the support plate 280 of the frame unit 200 and the plate 120 of the body unit 100 can be folded downward but cannot be folded upward due to the existence of the stopper 340. Thus, the connecting unit 300 helps the robot provided with the passively transformable wheel of the present embodiment to climb an obstacle and also helps the frame unit 200 and the body unit 100 to keep a horizontal state during normal driving.

The robot provided with the passively transformable wheel can rapidly drive on a flat surface with a circular or substantially circular wheel shape. If the robot encounters a protruding terrain or an obstacle such as a stair or the like, the passively transformable wheel is transformed into a legged-wheel shape with the trigger leg and the passive legs frictionally unfolded. This enables the robot to climb an obstacle. Accordingly, the robot can drive over different kinds of terrains and can be mass-produced with a simple structure.

Although the invention has been described in connection with the embodiment of the invention, it will be apparent to those skilled in the art that various modifications and changes may be made thereto without departing from the scope and spirit of the invention. Although it is possible for those skilled in the art to modify materials, size, etc. of the respective components based on applicable areas or to combine or substitute the disclosed embodiments to embody the other types that are not specifically disclosed in the disclosure, they do not depart from the scope of the present invention as well. Therefore, it should be understood that the above embodiments are not limitative, but illustrative in all aspects, and the modifications and equivalents that fall within the technical idea of the present invention are intended to be embraced by the scope of the claims of the present invention.

What is claimed is:

1. A passive transformable wheel, comprising:
    a wheel base including a centrally positioned transmitter rotation shaft, a trigger leg rotation shaft positioned in an outer periphery of the wheel base and one or more passive leg rotation shafts positioned in the outer periphery of the wheel base;
    a force transmitter rotatably coupled to an end of the transmitter rotation shaft, the force transmitter including a trigger slide and one or more passive leg joints spaced apart from one another;
    a trigger leg arranged between the wheel base and the force transmitter and rotatably coupled to the trigger leg rotation shaft, the trigger leg including a trigger joint fitted to the trigger slide; and
    one or more passive legs arranged between the wheel base and the force transmitter so as not to interfere with the trigger leg and rotatably coupled to the passive leg rotation shafts, the passive legs including one or more passive leg slides engaging with the passive leg joints of the force transmitter,
    wherein, when the trigger leg is unfolded by the frictional contact with a road surface, the trigger joint is configured to rotate the force transmitter through the trigger slide of the force transmitter, and upon rotation of the force transmitter, the passive leg joints of the force transmitter are configured to rotate and unfold the passive legs through the passive leg slides of the passive legs.

2. The wheel of claim 1, wherein each of the trigger leg and the passive legs further includes a grip portion coupled to an inner surface and an outer surface thereof.

3. The wheel of claim 1, wherein the passive legs include:
    a first passive leg arranged between the wheel base and the force transmitter so as not to interfere with the trigger leg and rotatably coupled to a first passive leg rotation shaft of the wheel base, the first passive leg provided with a first passive leg slide engaging with a first passive leg joint of the force transmitter; and
    a second passive leg arranged between the first passive leg and the trigger leg and rotatably coupled to a second passive leg rotation shaft, the second passive leg provided with a second passive leg slide engaging with a second passive leg joint of the force transmitter.

4. The wheel of claim 1, wherein a resilient member for returning the trigger leg and the passive legs unfolded into a legged-wheel shape to an original round shape is coupled to at least one of the trigger leg rotation shaft and the passive leg rotation shafts.

5. The wheel of claim 1, wherein the trigger leg includes:
    a link portion linearly extending toward the trigger slide such that the trigger joint is inserted into the trigger slide;
    a bent portion unitarily formed with the link portion and coupled to the trigger leg rotation shaft of the wheel base; and
    a support portion extending from the bent portion along a contour line of the passively transformable wheel, the trigger joint protruding from a side surface of the link portion of the trigger leg.

6. The wheel of claim 1, wherein each of the passive legs includes:
    a link portion linearly extending toward a base portion of each of the passive leg joints such that each of the passive leg slides of the passive legs engages with each of the passive leg joints of the force transmitter;
    a bent portion unitarily formed with the link portion and coupled to each of the passive leg rotation shafts of the wheel base; and
    a support portion extending from the bent portion along a contour line of the passively transformable wheel, each of the passive leg slides formed into a groove or hole shape on a side surface of the link portion of each of the passive legs.

7. The wheel of claim 1, wherein the trigger leg and the passive legs include flat portions respectively formed at a distal end of the trigger leg, on an outer surface of a support portion of the trigger leg and on an outer surface of a support portion of each of the passive legs.

8. A robot having the passive transformable wheel of claim 1, the robot comprising:
- a body unit in which a circuit unit for controlling the robot is installed;
- a frame unit positioned in front of the body unit and provided with a motor unit for driving the passively transformable wheel; and
- a connecting unit for interconnecting the body unit and the frame unit.

9. The robot of claim 8, further comprising:
- a shock absorbing unit for absorbing a shock transmitted from the passively transformable wheel toward the body unit.

10. The robot of claim 9, wherein the shock absorbing unit includes:
- a shock absorbing shaft coupled to a support plate of the frame unit; and
- a shock absorbing member coupled to the shock absorbing shaft so as to resiliently support a wing portion of a motor mount vertically movable along the shock absorbing shaft.

11. The robot of claim 8, wherein the connecting unit includes:
- a hinge bracket installed in a support plate of the frame unit;
- a hinge projection installed in a plate of the body unit;
- a connecting shaft for rotatably interconnecting the hinge bracket and the hinge projection; and
- a stopper for supporting the plate of the body unit so that the support plate and the plate can make rotation within a limited angular extent.

12. A passive transformable wheel, comprising:
- a wheel base including a centrally positioned transmitter rotation shaft, a trigger leg rotation shaft positioned in an outer periphery of the wheel base and one or more passive leg rotation shafts positioned in the outer periphery of the wheel base;
- a force transmitter rotatably coupled to an end of the transmitter rotation shaft, the force transmitter including a trigger slide and one or more passive leg joints spaced apart from one another;
- a trigger leg arranged between the wheel base and the force transmitter and rotatably coupled to the trigger leg rotation shaft, the trigger leg including a trigger joint fitted to the trigger slide; and
- one or more passive legs arranged between the wheel base and the force transmitter so as not to interfere with the trigger leg and rotatably coupled to the passive leg rotation shafts, the passive legs including one or more passive leg slides engaging with the passive leg joints of the force transmitter,
- wherein each of the trigger slide and the passive leg slides includes a first side portion formed of one half portion of an arc corresponding to a moving path of the trigger joint or a moving path of each of the passive leg joints of the force transmitter; and a second side portion formed of the other half portion of the arc.

13. The wheel of claim 12, wherein the first side portion and the second side portion of each of the trigger slide and the passive leg slides has a curvature identical with a curvature of the arc corresponding to the moving path of the trigger joint or the moving path of each of the passive leg joints of the force transmitter.

14. A passive transformable wheel, comprising:
- a plurality of joints and a plurality of slides asymmetrically installed in a trigger leg, a plurality of passive legs and a force transmitter,
- wherein one of the joints is provided in the trigger leg, the remaining joints provided in the force transmitter, one of the slides provided in the force transmitter, and the remaining slides respectively provided in the passive legs,
- and wherein, when the trigger leg is unfolded by the frictional contact with a road surface, one of the trigger joints is configured to rotate the force transmitter through the slide of the force transmitter, and upon rotation of the force transmitter, the remaining joints of the force transmitter are configured to rotate and unfold the passive legs through the slides of the passive legs.

15. The wheel of claim 14, wherein a resilient member for returning the trigger leg and the passive legs unfolded into a legged-wheel shape to an original round shape is coupled to at least one of a trigger leg rotation shaft to which the trigger leg is coupled and passive leg rotation shafts to which the passive legs are coupled.

16. A robot having the passive transformable wheel of claim 14, the robot comprising:
- a body unit in which a circuit unit for controlling the robot is installed;
- a frame unit positioned in front of the body unit and provided with a motor unit for driving the passively transformable wheel; and
- a connecting unit for interconnecting the body unit and the frame unit.

17. The robot of claim 16, further comprising:
- a shock absorbing unit for absorbing a shock transmitted from the passively transformable wheel toward the body unit.

18. The robot of claim 17, wherein the shock absorbing unit includes:
- a shock absorbing shaft coupled to a support plate of the frame unit; and
- a shock absorbing member coupled to the shock absorbing shaft so as to resiliently support a wing portion of a motor mount vertically movable along the shock absorbing shaft.

19. The robot of claim 16, wherein the connecting unit includes:
- a hinge bracket installed in a support plate of the frame unit;
- a hinge projection installed in a plate of the body unit;
- a connecting shaft for rotatably interconnecting the hinge bracket and the hinge projection; and
- a stopper for supporting the plate of the body unit so that the support plate and the plate can make rotation within a limited angular extent.

* * * * *